US012731220B2

(12) United States Patent
Chen

(10) Patent No.: US 12,731,220 B2
(45) Date of Patent: Sep. 8, 2026

(54) VIDEO TEXTURE MIGRATION METHOD, ELECTRONIC DEVICE AND STORAGE MEDIUM

(71) Applicant: Beijing Zitiao Network Technology Co., Ltd., Beijing (CN)

(72) Inventor: Mingjin Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 166 days.

(21) Appl. No.: 18/723,349

(22) PCT Filed: Dec. 20, 2022

(86) PCT No.: PCT/CN2022/140423
§ 371 (c)(1),
(2) Date: Jun. 21, 2024

(87) PCT Pub. No.: WO2023/116711
PCT Pub. Date: Jun. 29, 2023

(65) Prior Publication Data

US 2025/0156999 A1 May 15, 2025

(30) Foreign Application Priority Data

Dec. 24, 2021 (CN) ......................... 202111595927.0

(51) Int. Cl.
*G06T 5/50* (2006.01)
*G06T 5/60* (2024.01)
(Continued)

(52) U.S. Cl.
CPC .................. *G06T 5/50* (2013.01); *G06T 5/60* (2024.01); *G06T 5/70* (2024.01); *G06V 10/44* (2022.01);
(Continued)

(58) Field of Classification Search
None
See application file for complete search history.

(56) References Cited

U.S. PATENT DOCUMENTS

2009/0160865 A1 6/2009 Grossman
2021/0256304 A1 8/2021 Hsiao
2021/0385503 A1 12/2021 Tian et al.

FOREIGN PATENT DOCUMENTS

CN 110288667 A 9/2019
CN 110738605 A 1/2020
(Continued)

OTHER PUBLICATIONS

Li, H.—"Image Super-Resolution Algorithm Based on RRDB Model"—IEEE Nov. 30, 2021—pp. 156260-156273 (Year: 2021).*
(Continued)

*Primary Examiner* — Bernard Krasnic
(74) *Attorney, Agent, or Firm* — BakerHostetler

(57) ABSTRACT

A video texture migration method, an apparatus, an electronic device and a storage medium are provided. The method includes: acquiring an initial video; performing feature extraction on a target frame to generate first feature information of the target frame, wherein the target frame is a video frame posterior to an Nth video frame in the initial video; performing feature fusion on the first feature information and reference feature information to obtain second feature information, wherein the reference feature information represents an image structure contour of reference frames, and the reference frames are video frames prior to the target frame; and generating a texture migration video according to the second feature information and corresponding texture feature information, wherein the texture feature information represents image texture detail of a reference image.

20 Claims, 10 Drawing Sheets

(51) Int. Cl.

| | |
|---|---|
| ***G06T 5/70*** | (2024.01) |
| ***G06V 10/44*** | (2022.01) |
| ***G06V 10/54*** | (2022.01) |
| ***G06V 10/77*** | (2022.01) |
| ***G06V 10/82*** | (2022.01) |
| ***G06V 20/40*** | (2022.01) |

(52) U.S. Cl.

CPC .......... *G06V 10/54* (2022.01); *G06V 10/7715* (2022.01); *G06V 10/82* (2022.01); *G06V 20/46* (2022.01); *G06T 2207/10016* (2013.01); *G06T 2207/20084* (2013.01); *G06T 2207/20212* (2013.01)

(56) References Cited

FOREIGN PATENT DOCUMENTS

| | | |
|---|---|---|
| CN | 111640172 A | 9/2020 |
| CN | 111667399 A | 9/2020 |
| CN | 112200816 A | 1/2021 |
| CN | 112883806 A | 6/2021 |
| CN | 113556442 A | 10/2021 |
| CN | 113793253 A | 12/2021 |

OTHER PUBLICATIONS

Qin, Go.—"Virtual Reality Video Image Classification Based on Texture Features"—Hindawi May 18, 2021—pp. 1-11 (Year: 2021).*

Danier, D.—"Texture-Aware Video Frame Interpolation"—arXiv Feb. 26, 2021—pp. 1-7 (Year: 2021).*

European Patent Application No. 22910023.5; Extended Search Report; dated Dec. 20, 2024; 9 pages.

Dushkoff et al.; "A Temporally Coherent Neural Algorithm for Artistic Style Transfer"; 23rd Int'l Conf. on Pattern Recognition; Dec. 2016; p. 3288-3293.

International Patent Application No. PCT/CN2022/140423; Int'l Search Report; dated Feb. 8, 2023; 2 pages.

China Patent Application No. 202111595927.0; Registration Notification; dated May 1, 2026; 10 pages.

Deng et al.; "Arbitrary Video Style Transfer via Multi-Channel Correlation"; arXiv:2009.08003; Jan. 2021; 8 pages.

* cited by examiner

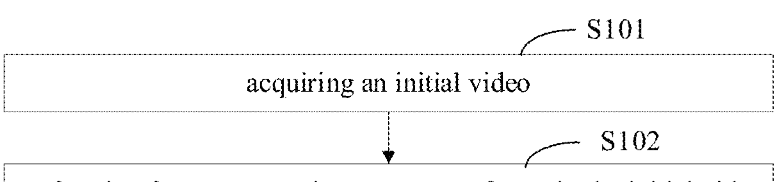

performing feature extraction on a target frame in the initial video to generate first feature information of the target frame, wherein the target frame is a video frame posterior to an Nth video frame in the initial video, and the first feature information represents an image structure contour of the target frame

S103 performing feature fusion on the first feature information of the target frame and the reference feature information to obtain second feature information of the target frame, wherein the reference feature information represents an image structure contour of the reference frames, the reference frames are video frames prior to the target frame, and the second feature information is the first feature information undergoing removal of random noises

generating a texture migration video according to the second feature information of the target frame and the corresponding texture feature information, wherein the texture feature information represents the image texture feature of the reference image

FIG. 3

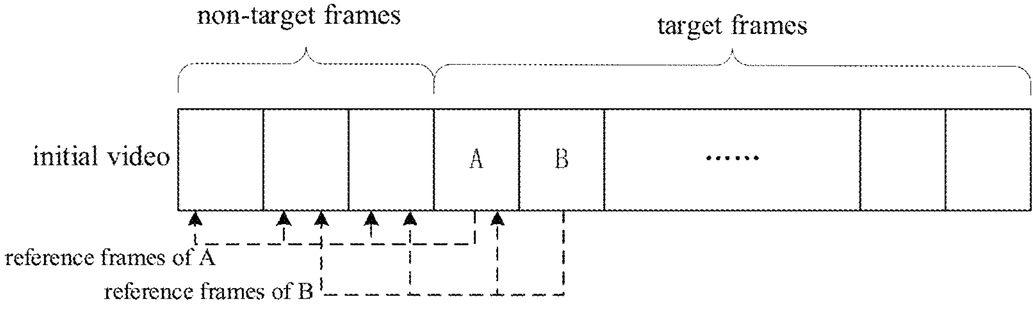

FIG. 4 electronic device 900
901
processing apparatus
902
ROM
903
RAM
904
905
I/O interface
906
input apparatus
907
output apparatus
908
storage apparatus
909
communication apparatus

VIDEO TEXTURE MIGRATION METHOD, ELECTRONIC DEVICE AND STORAGE MEDIUM

The present application is the U.S. National Stage of International Application No. PCT/CN2022/140423, filed on Dec. 20, 2022, which claims the priority of Chinese patent application No. 202111595927.0, filed on Dec. 24, 2021, with title of "video texture migration method and apparatus, electronic device and storage medium", the entire disclosures of which are incorporated herein by reference as part of the disclosure of this application.

CROSS-REFERENCE TO RELATED APPLICATION

The present application claims the priority of Chinese patent application No. 202111595927.0, filed on Dec. 24, 2021, with title of "video texture migration method and apparatus, electronic device and storage medium", the entire disclosure of which is incorporated herein by reference as part of the disclosure of this application.

TECHNICAL FIELD

Embodiments of the present disclosure relate to the field of video image processing technology, and more particularly, to a video texture migration method, an apparatus, an electronic device, a storage medium, a computer program product, and a computer program.

BACKGROUND

Image style migration is one of the currently popular image processing techniques. A common technical solution at present is to perform migration based on the image feature of a reference image, so that a generated migration image has color tonality or imaging style of the reference image. However, meanwhile, such image migration targeting color tonality and imaging style may cause distortion of the migration image, thereby affecting impressions of the image.

In order to further improve manifestation effects of image style migration, a texture migration technique for performing feature migration on image texture has been proposed in related art, which may implement image texture migration and make the generated migration image have the image texture of the reference image, which further improves realism of the image.

However, in the scenario of video texture migration, the generated texture migration video has a problem of inter-frame flicker between video frames, which affects the display effect of the video.

SUMMARY

The embodiments of the present disclosure provide a video texture migration method, an apparatus, an electronic device, a storage medium, a computer program product, and a computer program, to overcome the problem of inter-frame flicker between video frames of a texture migration video that affects the video display effect.

In the first aspect, the embodiments of the present disclosure provide a video texture migration method, which comprises:

acquiring an initial video; performing feature extraction on a target frame in the initial video to generate first feature information of the target frame, wherein the target frame is a video frame posterior to an Nth video frame in the initial video, and the first feature information represents an image structure contour of the target frame; performing feature fusion on the first feature information of the target frame and reference feature information to obtain second feature information of the target frame, wherein the reference feature information represents an image structure contour of reference frames, the reference frames are video frames prior to the target frame, and the second feature information is the first feature information undergoing removal of random noises; and generating a texture migration video according to the second feature information of the target frame and corresponding texture feature information, wherein the texture feature information represents an image texture detail of a reference image.

In the second aspect, the embodiments of the present disclosure provide a video texture migration apparatus, which comprises:

- an acquiring module, configured to acquire an initial video;
- a feature extracting module, configured to perform feature extraction on a target frame in the initial video to generate first feature information of the target frame, wherein the target frame is a video frame posterior to an Nth video frame in the initial video, and the first feature information represents an image structure contour of the target frame;
- a feature fusing module, configured to perform feature fusion on the first feature information of the target frame and reference feature information to obtain second feature information of the target frame, wherein the reference feature information represents an image structure contour of reference frames, the reference frames are video frames prior to the target frame, and the second feature information is the first feature information undergoing removal of random noises; and
- a texture migration module, configured to generate a texture migration video according to the second feature information of the target frame and the corresponding texture feature information, wherein the texture feature information represents an image texture detail of a reference image.

In the third aspect, the embodiments of the present disclosure provide an electronic device, which comprises:

- a processor and a memory in communicative connection with the processor,
- computer execution instructions are stored in the memory; and
- the processor executes the computer execution instructions stored in the memory to implement the video texture migration method as described in the above first aspect and various possible designs of the first aspect.

In the fourth aspect, the embodiments of the present disclosure provide a computer-readable storage medium, wherein computer execution instructions are stored on the computer-readable storage medium, and a processor, when executing the computer execution instructions, implements the video texture migration method as described in the above first aspect and various possible designs of the first aspect.

In the fifth aspect, the embodiments of the present disclosure provide a computer program product, which comprises a computer program, wherein the computer program, when executed by a processor, implements the video texture migration method as described in the above first aspect and various possible designs of the first aspect.

In the sixth aspect, the embodiments of the present disclosure provide a computer program, wherein the computer program, when executed by a processor, implements the video texture migration method as described in the above first aspect and various possible designs of the first aspect.

The embodiments of the present disclosure provide a video texture migration method, an apparatus, an electronic device, a storage medium, a computer program product, and a computer program. The method includes: acquiring an initial video; performing feature extraction on a target frame in the initial video to generate first feature information of the target frame, wherein the target frame is a video frame posterior to an Nth video frame in the initial video, and the first feature information represents an image structure contour of the target frame; performing feature fusion on the first feature information of the target frame and reference feature information to obtain second feature information of the target frame, wherein the reference feature information represents an image structure contour of reference frames, the reference frames are video frames prior to the target frame, and the second feature information is the first feature information undergoing removal of random noises; and generating a texture migration video according to the second feature information of the target frame and corresponding texture feature information, wherein the texture feature information represents an image texture detail of a reference image. Because feature fusion is performed on the first feature information of the target frame based on the first feature information of the corresponding reference frames after extracting the first feature information of the target frame in the initial video, random noises in the generated second feature information are reduced or eliminated, so that the problem of inter-frame flicker caused by random noises no long occurs between respective target frames in the generated texture migration video after fusing the second feature information based on the target frame and the corresponding texture feature information, which improves the display effect of the texture migration video.

BRIEF DESCRIPTION OF THE DRAWINGS

To explain the technical scheme of the embodiments of the present disclosure or the technical scheme in the existing technology more clearly, the drawings used in the description of the embodiments or the existing technology will be briefly described in the following. It is obvious that the drawings described below are only related to some embodiments of the present disclosure. For ordinary skilled person in the art, other drawings can be obtained according to these drawings without creative labor.

FIG. 3 is a schematic flow chart I of the video texture migration method provided by an embodiment of the present disclosure;

FIG. 4 is a schematic diagram of target frames and reference frames provided by an embodiment of the present disclosure;

DETAILED DESCRIPTION

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Hereinafter, application scenarios of the embodiments of the present disclosure are explained below.

Figure 1:
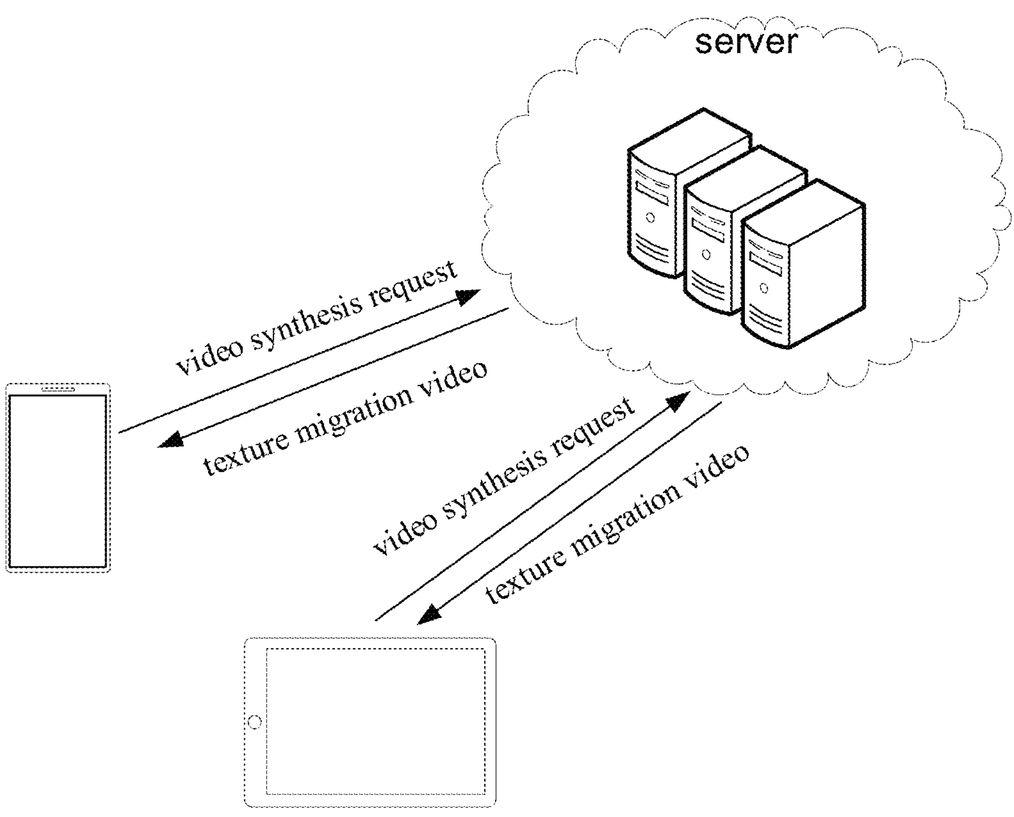
FIG. 1 is a diagram of an application scenario of a video texture migration method provided by an embodiment of the present disclosure.

FIG. 1 is a diagram of an application scenario of a video texture migration method provided by an embodiment of the present disclosure. The video texture migration method provided by the embodiments of the present disclosure can be applied to an application scenario of video synthesis. Specifically, as illustrated in FIG. 1, the method provided by the embodiments of the present disclosure may be applied to a server, the server is in communicative connection with a terminal device. After receiving a video synthesis request sent by the terminal device, by using the video texture migration method provided by the embodiments of the present disclosure, the server performs texture migration on the initial video and the reference image included or indicated in the video synthesis request, and migrates the texture feature possessed by the reference image into the initial video, so that the generated texture migration video has both the image structure feature of the initial video and the texture feature of the reference image. Thereafter, based on a request of the terminal device or a preset sending rule, the server sends the generated texture migration video to the terminal device, so that the terminal device obtains the synthesized texture migration video.

Figure 2:
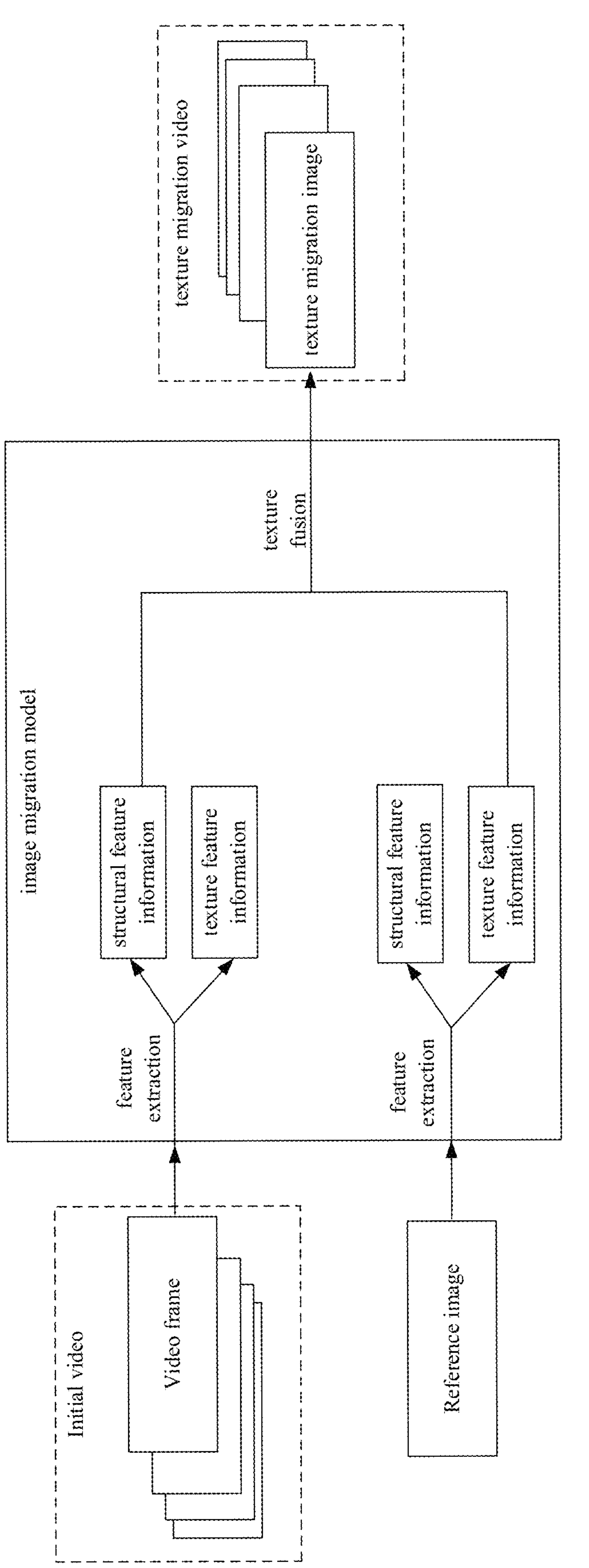
FIG. 2 is a schematic diagram of a process of generating a texture migration video in the prior art.

Currently, a texture migration technique for performing feature migration on image texture has been proposed in related art, which may implement image texture migration for an image, and make the generated migration image have the image texture of the reference image, which further improves realism of the image. However, in the scenario of video texture migration, the generated texture migration video has a problem of inter-frame flicker between video frames. FIG. 2 is a schematic diagram of a process of generating a texture migration video in the prior art, and the process may be implemented through a pre-trained image migration model. As illustrated in FIG. 2, through the pre-trained image migration model, feature extraction is sequentially performed on each video frame in the initial video to generate structural feature information and texture feature information corresponding thereto; meanwhile, feature extraction is also performed on the reference image to generate structural feature information and texture feature information corresponding thereto; thereafter, texture fusion is performed on global texture feature information of the reference image and the structural feature information of the target frame, to generate a texture migration image corresponding to the target frame; and then, respective texture migration images are combined to obtain the texture migration video.

However, in the above-described process, the structural feature information of the target frame that is obtained through feature extraction by the pre-trained image migration model has certain randomness, that is, there are random noises. Thus, after feature fusion, the generated corresponding texture migration image also has random noises, so that inter-frame flicker occurs when continuously playing the texture migration image. Therefore, there is currently an urgent need for a method capable of eliminating random noises in the structural feature information corresponding to the video frame during the process of generating the texture migration video, so as to eliminate the problem of inter-frame flicker in the texture migration video.

FIG. 3 is a schematic flow chart I of the video texture migration method provided by the embodiments of the present disclosure. The method of this embodiment may be applied to an electronic device. In one possible implementation, the method provided by this embodiment may be applied to the server or the terminal device in the diagram of the application scenario illustrated in FIG. 1. In this embodiment, it is illustrated by taking that the server is an executing body as an example. The video texture migration method includes following operations.

Step S101: acquiring an initial video.

Exemplarily, the initial video is a video to undergo texture migration, which may be obtained by the server through reading a corresponding video file. In this process, based on specific implementation solutions and requirements, steps such as video decoding may also be needed, and no details will be repeated here.

The initial video includes a plurality of video frames. There is a timing relationship between the plurality of video frames; and the play process of the initial video may be implemented by displaying the video frames frame by frame through a preset play timestamp. Further, the video texture migration method provided by this embodiment may be implemented by a pre-trained video texture migration model. Therefore, the step of acquiring an initial video in this embodiment is also equivalent to inputting the initial video into the video texture migration model used for implementing the method provided by this embodiment. After obtaining the input initial video, the video texture migration model processes the initial video based on subsequent embodiment steps, so as to obtain the corresponding texture migration video.

Step S102: performing feature extraction on a target frame in the initial video to generate first feature information of the target frame, wherein the target frame is a video frame posterior to an Nth video frame in the initial video, and the first feature information represents an image structure contour of the target frame.

Exemplarily, the video texture migration model for implementing the method provided by this embodiment includes a functional unit for performing feature extraction on the video frame of the initial video. Specifically, for example, feature extraction on the video frame of the initial video may be implemented based on the Encoder-Decoder model framework. Encoder-Decoder is a commonly used model framework in deep learning, for example, auto-encoding of unsupervised algorithms is designed and trained based on the structure of Encoder-Decoder. For another example, application of image caption in the prior art is based on the Encoder-Decoder framework of convolutional neural network (CNN)-recurrent neural network (RNN). Encoder and Decoder may process any data such as text, speech and image by respectively setting corresponding processing models, so as to achieve corresponding technical objectives. More specifically, in this embodiment, encoder is used for implementing feature extraction on the video frame of the initial video. While decoder is used in subsequent steps to implement feature fusion and generate the texture migration video. Exemplarily, encoder and decoder are encoder and decoder based on a pre-trained generative adversarial net (GAN) model.

Exemplarily, after performing feature extraction on the video frame, the video texture migration model may generate first feature information and first texture information corresponding to the video frame. The first feature information represents an image structure feature, and more specifically, an image structure contour; the first texture information represents an image texture feature, and more specifically, an image texture detail. Exemplarily, the first feature information and the first texture information may be implemented in a form of pixel matrix. The specific implementation method of generating the first feature information and the first texture information corresponding thereto though encoder performing feature extraction on the video frame in the initial video is prior art, and no details will be repeated here.

Further, exemplarily, the respective video frames in the initial image may be categorized into target frames and non-target frames. The target frame is a video frame posterior to an Nth video frame in the initial video, where N is a positive integer. In subsequent steps, the target frame in the video frames is processed to achieve the purpose of eliminating inter-frame flicker. The specific implementation method will be introduced in detail in the subsequent implementation steps. The step of sequentially performing feature extraction on the target frames in the initial video is just a portion of the process of performing feature extraction on the video frames in the initial video based on Encoder as introduced above, and no details will be repeated here.

Step S103: performing feature fusion on the first feature information of the target frame and the reference feature information to obtain second feature information of the target frame, wherein the reference feature information represents an image structure contour of the reference frames, the reference frames are video frames prior to the target frame, and the second feature information is the first feature information undergoing removal of random noises.

FIG. 4 is a schematic diagram of target frames and reference frames provided by the embodiments of the present disclosure. As illustrated in FIG. 4, exemplarily, in the respective video frames in the initial video, video frames posterior to the Nth frame are target frames, while the first N video frames are non-target frames. After starting processing the initial video, the video texture migration model sequentially performs feature extraction on the respective video frames in the initial video, to sequentially obtain first feature information and first texture information corresponding to each video frame. When processing to a target frame, the video texture migration model determines reference frames corresponding to the target frame, that is, M video frames prior to the target frame, where M is a positive integer less than or equal to N. More specifically, as illustrated in the diagram, when M=N=3, that is, video frames from a 4th video frame are target frames, and 3 video frames prior to the target frames are reference frames of the target frame, that is, the 3 video frames prior to target frame A are reference frames of target frame A, and the 3 video frames prior to target frame B are reference frames of target frame B.

Further, feature fusion is performed according to the first feature information of the target frame and the reference feature information of the corresponding reference frames, so that the second feature information having random noises removed may be obtained. The reference feature information is equivalent to the first feature information of the reference frame. The first feature information represents the image structure feature of the image, which is substantially stable in image structure for several adjacent frames in the video, therefore, after performing feature fusion of the target frame and several frames of image prior thereto (i.e. the reference frames), a common structural feature thereof may be reinforced, so as to achieve the purpose of weakening different random noises possessed thereby. More specifically, there are various methods for performing feature fusion on the target frame and the reference frames, for example, performing weighted averaging on the target frame and the respective reference frames, to obtain the second feature information having random noises removed. Or, correlation calculation is performed on the target frame and the reference frames, to generate the second feature information according to relevant calculation results, specific implementation steps of average calculation and correlation calculation of the image are prior art, and no details will be repeated here. Of course, it should be noted that the second feature information referred to in the steps in this embodiment is a result of denoising the first feature information of the target frame, and the second feature information has fewer random noises relative to the first feature information. However, based on differences in image samples, the second feature information per se may still include some random noises. Therefore, the second feature information referred to in this embodiment is not limited by a specific noise level included thereby.

Figure 5:
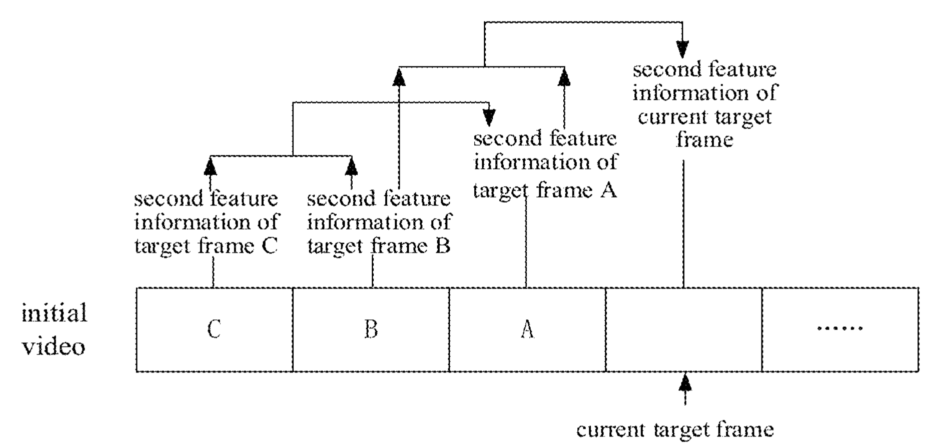
FIG. 5 is a schematic diagram of a process of sequentially determining second feature information of respective target frames provided by an embodiment of the present disclosure.

Further, exemplarily, in the process of real-time video texture migration method, feature fusion needs to be performed sequentially on the respective target frames, so as to generate the second feature information corresponding to the respective target frames. Hereinafter, the process of sequentially performing feature fusion on the first feature information of the respective target frames and the reference feature information corresponding to the respective target frames will be introduced in more details. FIG. 5 is a schematic diagram of a process of sequentially determining the second feature information of the respective target frames provided by the embodiments of the present disclosure. As illustrated in FIG. 5, during the process of sequentially processing the respective target frames (C, B, A), the reference frame corresponding to a current target frame is a target frame prior to the current target frame, that is, the video texture migration model executing the solution provided by this embodiment sequentially processes the respective target frames based on play timing of the respective target frames when generating the second feature information corresponding to the respective target frames, that is, takes a previous processed target frame as the reference frame of the current target frame, and takes second feature information of the previous processed target frame as reference feature information of the reference frame of the current target frame for calculation. With respect to the first target frame located at the boundary (and several target frames posterior thereto), the boundary problem may be solved by mapping non-target frames prior thereto as target frames, and mapping first feature information of the non-target frames as second feature information of the target frames. By using the method of sequentially processing the target frames provided by this embodiment, except for the first target frame, the reference feature information of the reference frames used in the process of generating the second feature information of other target frames is always generated through second feature information of previous target frames, and the second feature information of the previously processed target frames does not include random noises or only includes a small amount of random noises. Therefore, through constant iterative averaging in the procedure of sequentially processing the target frames, the random noises carried in the reference frame are getting fewer and fewer. Further, by fusing the reference frame having random noises removed and the current target frame, a better denoising effect can be achieved, which avoids introducing random noises while reducing random noises in the second feature information of the target frames.

Step S104: generating a texture migration video according to the second feature information of the target frame and the corresponding texture feature information, wherein the texture feature information represents the image texture feature of the reference image.

Exemplarily, the determined second feature information of the target frame are fused with the texture feature information representing an image texture detail feature through Decoder in the video texture migration model, so as to achieve the purpose of texture detail filling within the image contour represented by the second feature information, thereby generating a texture migration image after performing texture migration on the target frame.

Further, the texture migration images corresponding to the respective target frames are combined according to the play timing of the texture migration images corresponding to the respective target frames, so as to generate the texture migration video. The specific implementation of fusing the information representing the image structure feature and the information representing the image texture feature is prior art which is well known, and no details will be repeated here.

The texture feature information represents the image texture detail of the reference image. Different target frames may correspond to a same reference image, or may also correspond to different reference images. If the target frames of the initial video correspond to 2 or more reference images, then based on a preset mapping relationship, the reference image corresponding to the target frame may be determined, and the texture feature information corresponding to the second feature information of the target frame may be further determined.

Figure 6:
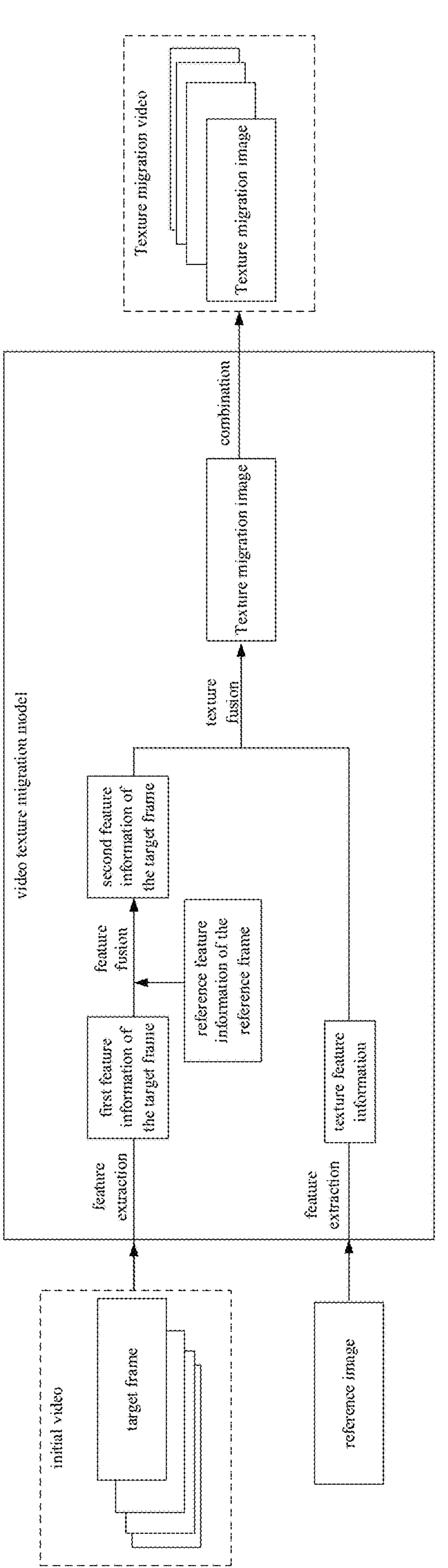
FIG. 6 is a schematic diagram of a process of generating a texture migration video provided by an embodiment of the present disclosure.

FIG. 6 is a schematic diagram of a process of generating the texture migration video provided by the embodiments of the present disclosure, and the video texture migration method provided by this embodiment is further introduced in conjunction with FIG. 6. Referring to FIG. 6, it is introduced by taking a process of processing one target frame in one initial video as an example. After acquiring the initial video, the video texture migration model performs feature extraction on the target frame in the initial video to obtain the first feature information of the video frame, and then performs feature fusion on the first feature information of the target frame based on reference feature information of corresponding reference frames to generate the second feature information. Meanwhile, feature extraction is performed on the reference images corresponding to respective target frames (in this embodiment, respective target frames correspond to the same reference image) to obtain the texture feature information. Then, texture fusion is performed on the second feature information corresponding to the target frame and the texture feature information to generate a corresponding texture migration image. And thereafter, the texture migration images corresponding to respective target frames are combined according to the play timing thereof, so as to generate the texture migration video.

In this embodiment, the initial video is acquired; feature extraction is performed on the target frame in the initial video to generate the first feature information of the target frame, the target frame is a video frame posterior to an Nth video frame in the initial video, and the first feature information represents an image structure contour of the target frame; feature fusion is performed on the first feature information of the target frame and the reference feature information to obtain the second feature information of the target frame, the reference feature information represents an image structure contour of the reference frames, the reference frames are video frames prior to the target frame, and the second feature information is the first feature information having random noises removed; and the texture migration video is generated according to the second feature information of the target frame and the corresponding texture feature information, and the texture feature information represents an image texture detail of the reference image. Because feature fusion is performed on the first feature information of the target frame based on the reference feature information of the corresponding reference frame after extracting the first feature information of the target frame of the initial video, random noises in the generated second feature information are reduced or eliminated, and further the problem of inter-frame flicker between respective target frames caused by random noises no longer occurs in the generated texture migration video after fusing the second feature information of the target frame and the corresponding texture feature information, which improves the display effect of the texture migration video.

Figure 7:
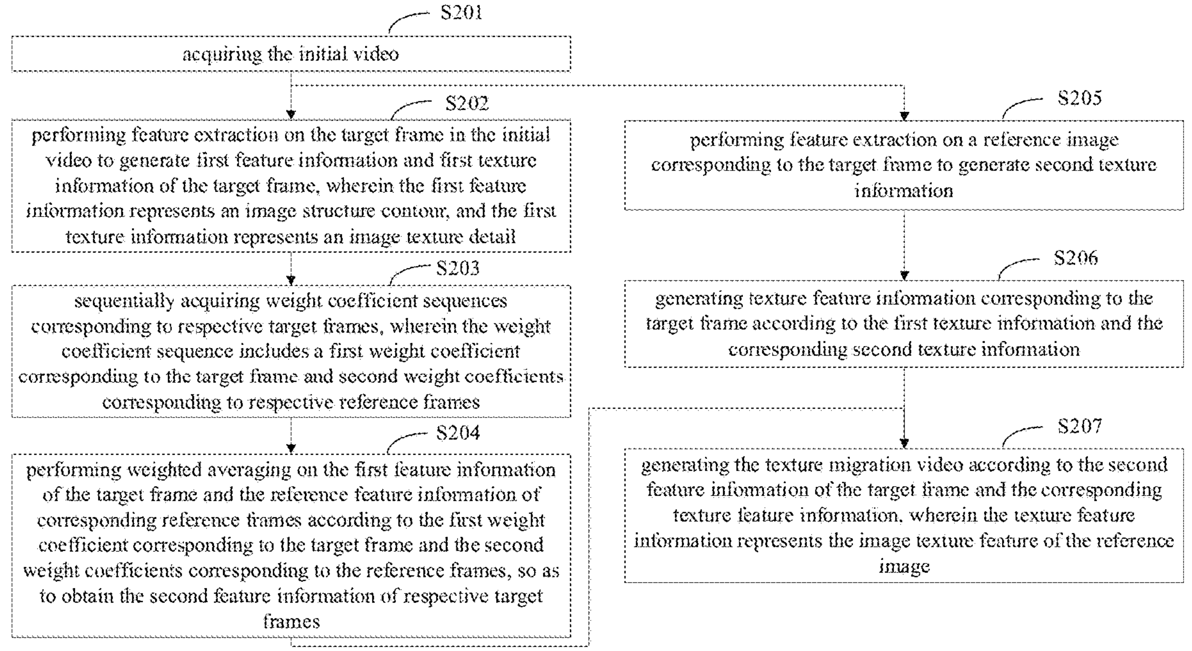
FIG. 7 is a schematic flow chart II of the video texture migration method provided by an embodiment of the present disclosure.

FIG. 7 is a schematic flow chart II of the video texture migration method provided by the embodiments of the present disclosure. On the basis of the embodiment illustrated in FIG. 3, this embodiment further refines step S103, and the video texture migration method includes following operations.

Step S201: acquiring the initial video.

Step S202: performing feature extraction on the target frame in the initial video to generate first feature information and first texture information of the target frame, wherein the first feature information represents an image structure contour, and the first texture information represents an image texture detail.

Step S203: sequentially acquiring weight coefficient sequences corresponding to respective target frames, wherein the weight coefficient sequence includes a first weight coefficient corresponding to the target frame and second weight coefficients corresponding to respective reference frames.

Exemplarily, the weight coefficient sequence includes at least one weight coefficient. In one possible implementation, when the weight coefficient sequence includes only one weight coefficient, the first weight coefficient corresponding to the target frame is equal to the second weight coefficient corresponding to the reference frame. Exemplarily, the specific value of the weight coefficient may be determined by the number of reference frames. The weight coefficient is a reciprocal of a value and this value is the number of reference frames plus 1, for example, if the target frame corresponds to 3 reference frames, in the case where the weight coefficient sequence includes only one weight coefficient, the weight coefficient is 0.25, that is, the weight coefficients of the target frame and the three reference frames are equal and are 0.25. In subsequent calculation of the second feature information of the target frame based on the weight coefficient sequence, such case is equivalent to averaging the first feature information of the target frame with the reference feature information of the respective reference frames to obtain the second feature information. More specifically, according to the specific implementation form of the first feature information, for example, when the form is a pixel matrix, the pixel matrix corresponding to the target frame is averaged with pixel matrices corresponding to the three reference frames, so as to generate an average matrix, that is, the second feature information.

In another possible implementation, the weight coefficient sequence includes weight coefficients the number of which is equal to the sum of the number of reference frames and the number of target frames, that is, the reference frames and the target frames each correspond to a weight coefficient. The target frame corresponds to a first weight coefficient, and the reference frame corresponds to a second weight coefficient. The second weight coefficients corresponding to respective reference frames may be the same or different.

Figure 8:
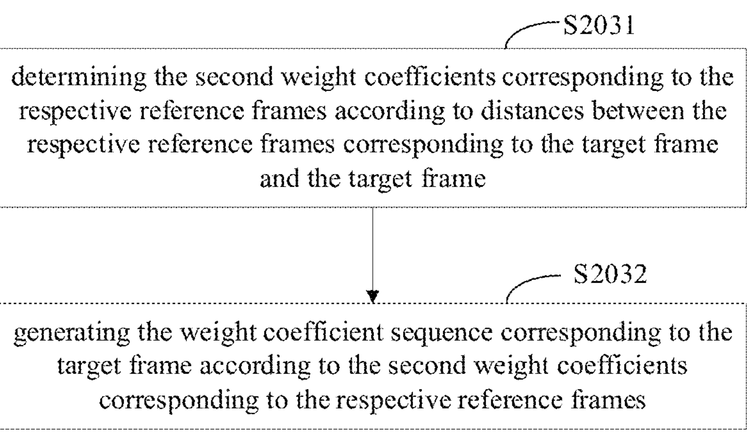
FIG. 8 is a schematic diagram of implementation of step S203 according to the embodiment illustrated in FIG. 7.

Exemplarily, as illustrated in FIG. 8, step S203 includes two specific implementation steps: step S2031 and step S2032.

Step S2031: determining the second weight coefficients corresponding to the respective reference frames according to distances between the respective reference frames corresponding to the target frame and the target frame.

Step S2032: generating the weight coefficient sequence corresponding to the target frame according to the second weight coefficients corresponding to the respective reference frames.

Figure 9:
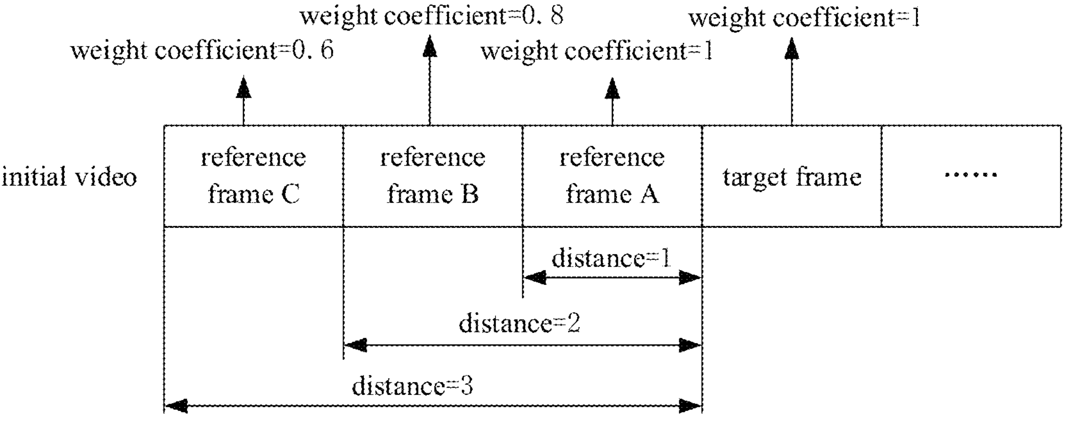
FIG. 9 is a schematic diagram of a weight coefficient sequence corresponding to a target frame provided by an embodiment of the present disclosure.

FIG. 9 is a schematic diagram of the weight coefficient sequence corresponding to the target frame provided by the embodiments of the present disclosure. As illustrated in FIG. 9, the target frame corresponds to 3 reference frames, namely, reference frame A, reference frame B, and reference frame C. The distance between reference frame A and the target frame is 1 (frame), the distance between reference frame B and the target frame is 2 (frames), and the distance between reference frame C and the target frame is 3 (frames). According to the distances between the respective reference frames and the target frame, it is respectively determined that the second weight coefficient of reference frame A is 1, the second weight coefficient of reference frame B is 0.8, and the second weight coefficient of reference frame C is 0.6. The first weight coefficient may be preset as 1. Therefore, the weight coefficient sequence is [0.6, 0.8, 1, 1]. The mapping relationship of the distances between the reference frames and the target frame and the second weight coefficients may be determined based on a preset mapping relationship table.

In subsequent calculation of the second feature information, through the weight coefficient sequence provided by the steps of this embodiment, a large weight value is set for a reference frame closer to the target frame, while a small weight value is set for a reference frame farther away from the target frame. This can alleviate the image blur problem caused by fusion of the reference frame farther away and the target frame, and improve accuracy of the second feature information of the target frame, so as to improve fineness of a texture migration image and a texture migration video subsequently synthesized, and enhance the image quality effect.

Step S204: performing weighted averaging on the first feature information of the target frame and the reference feature information of corresponding reference frames according to the first weight coefficient corresponding to the target frame and the second weight coefficients corresponding to the reference frames, so as to obtain the second feature information of respective target frames.

Figure 10:
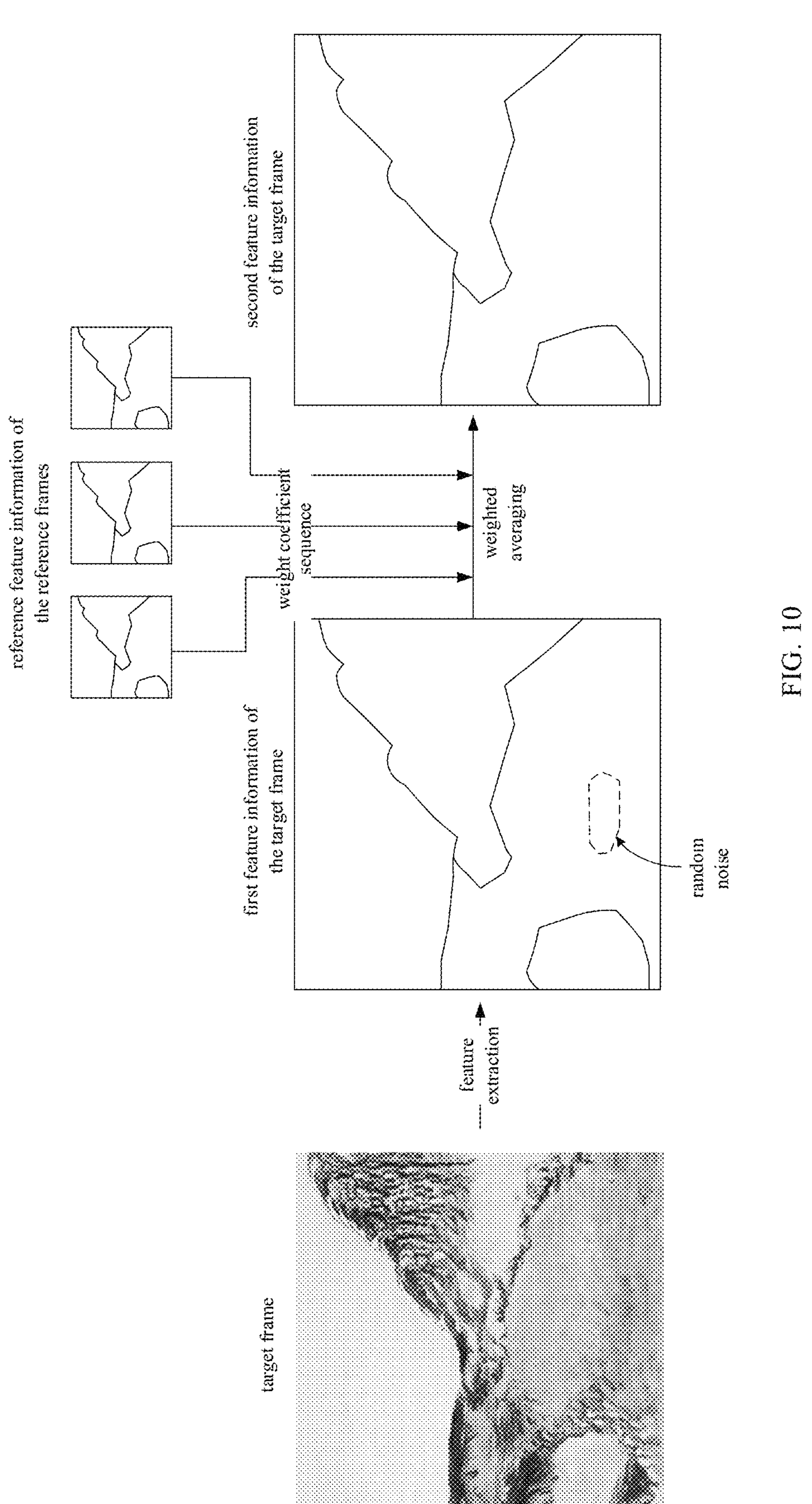
FIG. 10 is a schematic diagram of generating second feature information provided by an embodiment of the present disclosure.

Exemplarily, based on the first weight coefficient corresponding to the target frame and the second weight coefficients corresponding to the respective reference frames, weighted averaging is performed respectively on the first feature information of the target frame and the reference feature information of the reference frames, so as to generate the second feature information corresponding to the target frame. FIG. 10 is a schematic diagram of generating the second feature information provided by the embodiments of the present disclosure. Exemplarily, the first feature information may be implemented in a form of pixel matrix, and correspondingly, the fused second feature information is also a pixel matrix. Referring to FIG. 10, after performing feature extraction on any one target frame based on the pre-trained GAN model, the process of generating the first feature information may cause the first feature information to carry random noises. After performing weighted averaging on the first feature information of the target frame and the reference feature information of the corresponding reference frames through the weight coefficient sequence corresponding to the target frame (including the first weight coefficient corresponding to the target frame and the second weight coefficients corresponding to the respective reference frames), effective information in the respective pieces of first feature information is retained under an action of weighted averaging, while random noises are reduced due to weighted averaging, so that the random noises that initially exists in the first feature information of the target frame are reduced or eliminated.

Step S205: performing feature extraction on a reference image corresponding to the target frame to generate second texture information.

Step S206: generating texture feature information corresponding to the target frame according to the first texture information and the corresponding second texture information.

Figure 11:
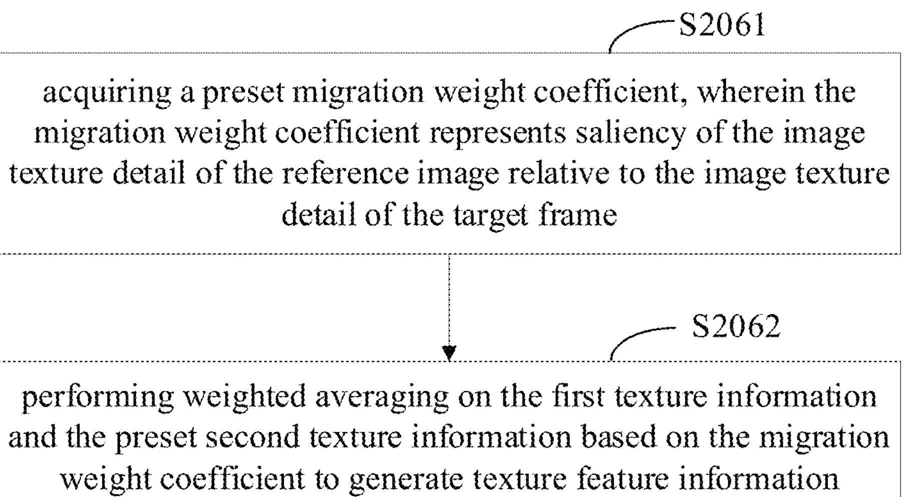
FIG. 11 is a schematic diagram of implementation of step S206 according to the embodiment illustrated in FIG. 7.

Optionally, as illustrated in FIG. 11, step S206 includes two specific implementation steps: step S2061 and step S2062.

Step S2061: acquiring a preset migration weight coefficient, wherein the migration weight coefficient represents saliency of the image texture detail of the reference image relative to the image texture detail of the target frame.

Step S2062: performing weighted averaging on the first texture information and the preset second texture information based on the migration weight coefficient to generate texture feature information.

Exemplarily, the migration weight coefficient is information representing saliency of the image texture detail relative to the image texture detail of the target frame, and specifically, refers to a degree to which the texture detail in the reference image is migrated to the target frame. For example, the greater the migration weight coefficient, the more the proportion of the texture detail of the reference image and the less the proportion of texture detail of the initial image in the generated texture migration image corresponding to the target frame, so that the texture migration image is more similar to the reference image; on the contrary, the less the migration weight coefficient, the more similar the texture migration image is to the initial image. After performing feature extraction on the target frame, the first texture information corresponding to the target frame that represents the image texture detail may be obtained. According to the migration weight coefficient, weighted averaging is performed on the first texture information and the second texture information, to generate corresponding texture feature information, so as to improve flexibility in generating the texture migration video by the model.

Step S207: generating the texture migration video according to the second feature information of the target frame and the corresponding texture feature information, wherein the texture feature information represents the image texture feature of the reference image.

In this embodiment, implementation of steps S201-S202 and S207 is the same as implementation of steps S101-S102 and S104 in the embodiment illustrated in FIG. 3 of the present disclosure, and no details will be repeated here.

Figure 12:
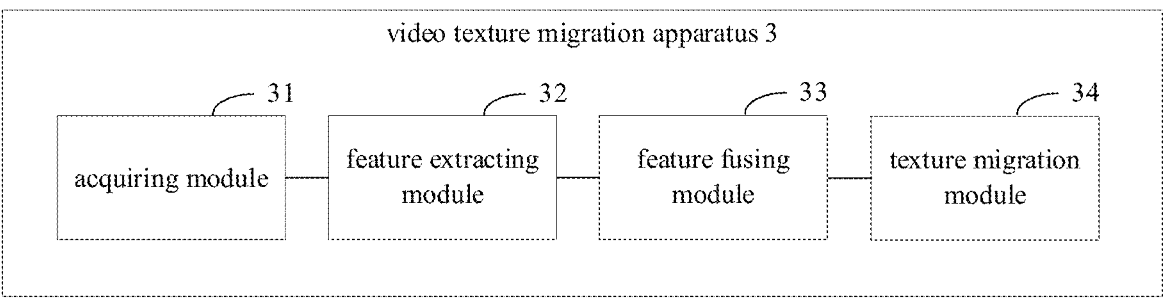
FIG. 12 is a structural block diagram of a video texture migration apparatus provided by an embodiment of the present disclosure.

Corresponding to the video texture migration method of the foregoing embodiments, FIG. 12 is a structural block diagram of a video texture migration apparatus provided by an embodiment of the present disclosure. For convenience of illustration, only parts related to the embodiments of the present disclosure are illustrated. Referring to FIG. 12, the video texture migration apparatus 3 includes:

an acquiring module 31, configured to acquire an initial video;

a feature extracting module 32, configured to perform feature extraction on a target frame in the initial video to generate first feature information of the target frame, wherein the target frame is a video frame posterior to an Nth video frame in the initial video, and the first feature information represents an image structure contour of the target frame;

a feature fusing module 33, configured to perform feature fusion on the first feature information of the target frame and the reference feature information to obtain second feature information of the target frame, wherein the reference feature information represents an image structure contour of reference frames, the reference frames are video frames prior to the target frame, and the second feature information is the first feature information undergoing removal of random noises; and a texture migration module 34, configured to generate a texture migration video according to the second feature information of the target frame and the corresponding texture feature information, wherein the texture feature information represents an image texture detail of a reference image.

In one embodiment of the present disclosure, the feature fusing module 33 is specifically configured to: acquire a weight coefficient sequence corresponding to the target frame, wherein the weight coefficient sequence includes a first weight coefficient corresponding to the target frame and second weight coefficients corresponding to the reference frames; perform weighted averaging on the first feature information of the target frame and the reference feature information of the corresponding reference frames according to the first weight coefficient corresponding to the target frame and the second weight coefficients corresponding to the reference frames, so as to obtain the second feature information of the target frame.

In one embodiment of the present disclosure, when acquiring the weight coefficient sequence corresponding to the target frame, the feature fusing module 33 is specifically configured to: determine the second weight coefficients corresponding to the reference frames according to distances between the respective reference frames and the target frame; and generate the weight coefficient sequence corresponding to the target frame according to the second weight coefficients corresponding to the reference frames.

In one embodiment of the present disclosure, the feature fusing module 33 is specifically configured to: acquire the second feature information of the reference frames; and generate reference feature information according to the second feature information of the reference frames.

In one embodiment of the present disclosure, the texture migration module 34 is specifically configured to: generate a texture migration image corresponding to the target frame according to the second feature information of the target frame and the corresponding texture feature information; and combine the texture migration images corresponding to the respective target frames based on play timing of the respective target frames in the initial video, so as to generate the texture migration video.

In one embodiment of the present disclosure, when generating the texture migration image corresponding to the target frame according to the second feature information of the target frame and the corresponding texture feature information, the texture migration module 34 is specifically configured to: perform texture fusion on the second feature information of the target frame and the corresponding texture feature information through a pre-trained generative adversarial net model, so as to generate the texture migration image.

In one embodiment of the present disclosure, the feature extracting module 32 is further configured to:

perform feature extraction on the target frame in the initial video to generate first texture information, wherein the first texture information represents the image texture detail of the target frame; perform feature extraction on the reference image corresponding to the target frame to generate second texture information, wherein the second texture information represents the image texture detail of the reference images; and generate the texture feature information corresponding to the target frame according to the first texture information and the corresponding second texture information.

In one embodiment of the present disclosure, the feature extracting module 32, when generating the texture feature information corresponding to the target frame according to the first texture information and the corresponding second texture information, is specifically configured to: acquire a preset migration weight coefficient, wherein the migration weight coefficient represents saliency of the image texture detail of the reference image relative to the image texture detail of the target frame; and perform weighted averaging on the first texture information and the preset second texture information based on the migration weight coefficient, so as to generate the texture feature information.

In one embodiment of the present disclosure, the feature extracting module 32, when performing feature extraction on the target frame to generate the first feature information of the target frame, is specifically configured to: perform feature extraction on the target frame based on the encoder in the pre-trained generative adversarial net model, so as to generate the first feature information of the target frame.

The acquiring module 31, the feature extracting module 32, the feature fusing module 33, and the texture migration module 34 are sequentially connected. The video texture migration apparatus 3 provided by this embodiment can execute the technical solution of the above-described method embodiments, and has similar implementation principle and technical effect, and no details will be repeated here in this embodiment.

Figures 13, 14:
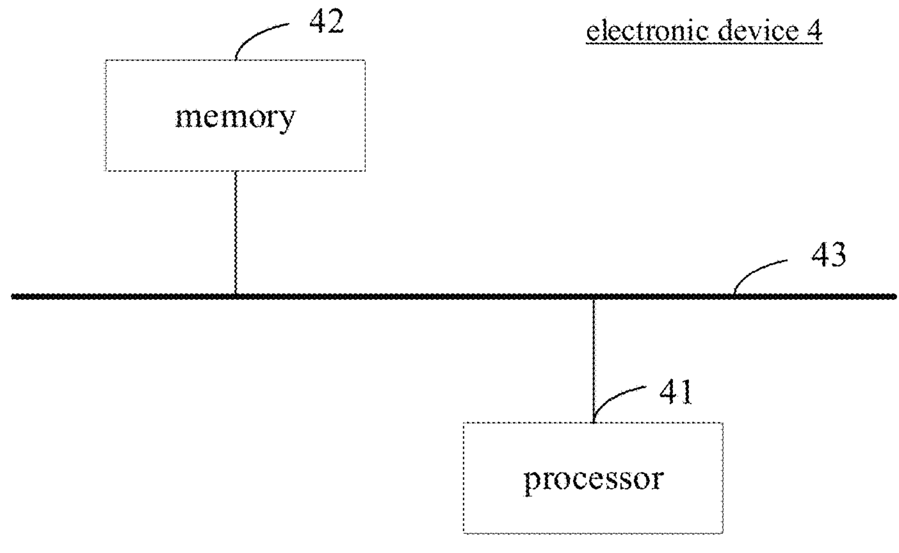
FIG. 13 is a schematic structural diagram of an electronic device provided by an embodiment of the present disclosure.
FIG. 14 is a schematic diagram of a hardware structure of the electronic device provided by an embodiment of the present disclosure.

FIG. 13 is a schematic structural diagram of an electronic device provided by an embodiment of the present disclosure. As illustrated in FIG. 13, the electronic device 4 includes:

a processor 41, and a memory 42 in communicative connection with the processor 41.

The memory 42 has computer execution instructions stored therein.

The processor 41 executes the computer execution instructions stored in the memory 42, so as to implement the video texture migration method in the embodiments illustrated in FIG. 3 to FIG. 11.

Optionally, the processor 41 and the memory 42 are connected via a bus 43.

Relevant description and effects corresponding to the steps of the embodiments corresponding to FIG. 3 to FIG. 11 may be referred to for relevant illustration, and no details will be repeated here.

Referring to FIG. 14, it shows a schematic structural diagram of an electronic device 900 suitable for implementing the embodiments of the present disclosure. The electronic device 900 may be a terminal device or a server. The terminal device may include but not limited to a mobile terminal such as a mobile phone, a laptop, a digital broadcast receiver, a personal digital assistant (PDA), a portable android device (PAD), a portable multimedia player (PMP), a vehicle-mounted terminal (e.g., a vehicle-mounted navigation terminal), etc., and a stationary terminal such as a digital television (TV), a desktop computer, etc. The electronic device illustrated in FIG. 14 is only an example and should not impose any limitation on functionality and scope of use of the embodiments of the present disclosure.

As illustrated in FIG. 14, the electronic device 900 may include a processing apparatus (e.g., a central processing unit, a graphics processing unit, etc.) 901, which may execute various appropriate actions and processing according to a program stored in a read-only memory (ROM) 902 or a program loaded from a storage apparatus 908 into a random access memory (RAM) 903. The RAM 903 further stores various programs and data required for operation of the electronic device 900. The processing apparatus 901, the ROM 902, and the RAM 903 are connected with each other through a bus 904. An input/output (I/O) interface 905 is also coupled to the bus 904.

Usually, apparatuses below may be coupled to the I/O interface 905: input apparatuses 906 including, for example, a touch screen, a touch pad, a keyboard, a mouse, a camera, a microphone, an accelerometer, a gyroscope, etc.; output apparatuses 907 including, for example, a liquid crystal display (LCD), a speaker, a vibrator, etc.; storage apparatuses 908 including, for example, a magnetic tape, a hard disk, etc.; and a communication apparatus 909. The communication apparatus 909 may allow the electronic device 900 to perform wireless or wired communication with other device so as to exchange data. Although FIG. 14 illustrates the electronic device 900 including various apparatuses, it should be understood that, it is not required to implement or have all the apparatuses illustrated, and the electronic device 900 may alternatively implement or have more or fewer apparatuses.

Specially, according to the embodiments of the present disclosure, the process described above with reference to the flow charts may be implemented as computer software programs. For example, the embodiments of the present disclosure include a computer program product, which includes a computer program carried on a computer readable medium, the computer program includes program codes for executing the method illustrated in the flow charts. In such embodiments, the computer program may be downloaded and installed from the network via the communication apparatus 909, or installed from the storage apparatus 908, or installed from the ROM 902. When executed by the processing apparatus 901, the computer program may execute the above-described functions defined in the method of the embodiments of the present disclosure.

It should be note that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. Examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to execute the method of the above embodiments.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances. For example, the first acquiring unit can also be described as "a unit that obtains at least two Internet protocol addresses".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. Examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In the first aspect, according to one or more embodiments of the present disclosure, a video texture migration method is provided, which comprises:

acquiring an initial video; performing feature extraction on a target frame in the initial video to generate first feature information of the target frame, wherein the target frame is a video frame posterior to an Nth video frame in the initial video, and the first feature information represents an image structure contour of the target frame; performing feature fusion on the first feature information of the target frame and reference feature information to obtain second feature information of the target frame, wherein the reference feature information represents an image structure contour of reference frames, the reference frames are video frames prior to the target frame, and the second feature information is the first feature information undergoing removal of random noises; and generating a texture migration video according to the second feature information of the target frame and corresponding texture feature information, wherein the texture feature information represents an image texture detail of a reference image.

According to one or more embodiments of the present disclosure, performing feature fusion on the first feature information of the target frame and the reference feature information to obtain the second feature information of the target frame comprises: acquiring a weight coefficient sequence corresponding to the target frame, wherein the weight coefficient sequence comprises a first weight coefficient corresponding to the target frame and second weight coefficients corresponding to respective reference frames; and sequentially performing weighted averaging on the first feature information of the target frame and the reference feature information of corresponding reference frames, according to the first weight coefficient corresponding to the target frame and the second weight coefficients corresponding to the respective reference frames, so as to obtain the second feature information of the target frame.

According to one or more embodiments of the present disclosure, acquiring the weight coefficient sequence corresponding to the target frame comprises: determining the second weight coefficients corresponding to the respective reference frames according to distances between the respective reference frames and the target frame; and generating the weight coefficient sequence corresponding to the target frame according to the second weight coefficients corresponding to the respective reference frames.

According to one or more embodiments of the present disclosure, the method further comprises: acquiring second feature information of the reference frames; and generating the reference feature information according to the second feature information of the reference frames.

According to one or more embodiments of the present disclosure, generating the texture migration video according to the second feature information of the target frame and corresponding texture feature information comprises: generating a texture migration image corresponding to the target frame according to the second feature information of the target frame and corresponding texture feature information; and combining texture migration images corresponding to respective target frames based on play timing of the respective target frames in the initial video, so as to generate the texture migration video.

According to one or more embodiments of the present disclosure, generating the texture migration image corresponding to the target frame according to the second feature information of the target frame and corresponding texture feature information comprises: performing texture fusion on the second feature information of the respective target frames and corresponding texture feature information through a pre-trained generative adversarial net model, so as to generate the texture migration image.

According to one or more embodiments of the present disclosure, the method further comprises: performing feature extraction on the target frame in the initial video to generate first texture information, wherein the first texture information represents an image texture detail of the target frame; performing feature extraction on the reference image corresponding to the target frame to generate second texture information, wherein the second texture information represents the image texture detail of the reference image; and generating the texture feature information corresponding to the target frame according to the first texture information and corresponding second texture information.

According to one or more embodiments of the present disclosure, generating the texture feature information corresponding to the target frame according to the first texture information and corresponding second texture information comprises: acquiring a migration weight coefficient that is preset, wherein the migration weight coefficient represents saliency of the image texture detail of the reference image relative to the image texture detail of the target frame; and performing weighted averaging on the first texture information and the second texture information based on the migration weight coefficient to generate the texture feature information.

According to one or more embodiments of the present disclosure, performing feature extraction on the target frame in the initial video to generate the first feature information of the target frame comprises: performing feature extraction on the target frame based on an encoder in a pre-trained generative adversarial net model, so as to generate the first feature information of the target frame.

In the second aspect, according to one or more embodiments of the present disclosure, a video texture migration apparatus is provided, which comprises:

an acquiring module, configured to acquire an initial video;

a feature extracting module, configured to perform feature extraction on a target frame in the initial video to generate first feature information of the target frame, wherein the target frame is a video frame posterior to an Nth video frame in the initial video, and the first feature information represents an image structure contour of the target frame;

a feature fusing module, configured to perform feature fusion on the first feature information of the target frame and reference feature information to obtain second feature information of the target frame, wherein the reference feature information represents an image structure contour of reference frames, the reference frames are video frames prior to the target frame, and the second feature information is the first feature information undergoing removal of random noises; and a texture migration module, configured to generate a texture migration video according to the second feature information of the target frame and the corresponding texture feature information, wherein the texture feature information represents an image texture detail of a reference image.

According to one or more embodiments of the present disclosure, the feature fusing module is specifically configured to: acquire a weight coefficient sequence corresponding to the target frame, wherein the weight coefficient sequence comprises a first weight coefficient corresponding to the target frame and second weight coefficients corresponding to respective reference frames; and sequentially perform weighted averaging on the first feature information of the target frame and the reference feature information of corresponding reference frames, according to the first weight coefficient corresponding to the target frame and the second weight coefficients corresponding to the respective reference frames, so as to obtain the second feature information of the target frame.

According to one or more embodiments of the present disclosure, when acquiring the weight coefficient sequence corresponding to the target frame, the feature fusing module is specifically configured to: determine the second weight coefficients corresponding to the respective reference frames according to distances between the respective reference frames and the target frame; and generate the weight coefficient sequence corresponding to the target frame according to the second weight coefficients corresponding to the respective reference frames.

According to one or more embodiments of the present disclosure, the feature fusing module is specifically configured to: acquire second feature information of the reference frames; and generate the reference feature information according to the second feature information of the reference frames.

According to one or more embodiments of the present disclosure, the texture migration module is specifically configured to: generate a texture migration image corresponding to the target frame according to the second feature information of the target frame and corresponding texture feature information; and combine texture migration images corresponding to respective target frames based on play timing of the respective target frames in the initial video, so as to generate the texture migration video.

According to one or more embodiments of the present disclosure, when generating the texture migration image corresponding to the target frame according to the second feature information of the target frame and corresponding texture feature information, the texture migration module is specifically configured to: perform texture fusion on the second feature information of the respective target frames and corresponding texture feature information through a pre-trained generative adversarial net model, so as to generate the texture migration image.

According to one or more embodiments of the present disclosure, the feature extracting module is further configured to: perform feature extraction on the target frame in the initial video to generate first texture information, wherein the first texture information represents an image texture detail of the target frame; perform feature extraction on the reference image corresponding to the target frame to generate second texture information, wherein the second texture information represents the image texture detail of the reference image; and generate the texture feature information corresponding to the target frame according to the first texture information and corresponding second texture information.

According to one or more embodiments of the present disclosure, when generating the texture feature information corresponding to the target frame according to the first texture information and corresponding second texture information, the feature extracting module is specifically configured to: acquire a migration weight coefficient that is preset, wherein the migration weight coefficient represents saliency of the image texture detail of the reference image relative to the image texture detail of the target frame; and perform weighted averaging on the first texture information and the second texture information based on the migration weight coefficient to generate the texture feature information.

According to one or more embodiments of the present disclosure, when performing feature extraction on the target frame in the initial video to generate the first feature information of the target frame, the feature extracting module is specifically configured to: perform feature extraction on the target frame based on an encoder in a pre-trained generative adversarial net model, so as to generate the first feature information of the target frame.

In the third aspect, according to one or more embodiments of the present disclosure, an electronic device is provided, which comprises: a processor and a memory in communicative connection with the processor.

Computer execution instructions are stored in the memory.

The processor executes the computer execution instructions stored in the memory to implement the video texture migration method as described in the above first aspect and various possible designs of the first aspect.

In the fourth aspect, according to one or more embodiments of the present disclosure, a computer-readable storage medium is provided. Computer execution instructions are stored on the computer-readable storage medium, and a processor, when executing the computer execution instructions, implements the video texture migration method as described in the above first aspect and various possible designs of the first aspect.

In the fifth aspect, according to one or more embodiments of the present disclosure, a computer program product is provided, which comprises a computer program. The computer program, when executed by a processor, implements the video texture migration method as described in the above first aspect and various possible designs of the first aspect.

In the sixth aspect, according to one or more embodiments of the present disclosure, a computer program is provided. The computer program, when executed by a processor, implements the video texture migration method as described in the above first aspect and various possible designs of the first aspect.

The above description is only for the preferred embodiments disclosed in this disclosure and an explanation of the technical principles used. Technicians in this field should understand that the scope of disclosure referred to in this disclosure is not limited to technical solutions formed by specific combinations of the aforementioned technical features, and should also cover other technical solutions formed by arbitrary combinations of the aforementioned technical features or their equivalent features without departing from the concept of the disclosure, such as technical solutions formed by replacing the above features with technical features having similar functions disclosed in (but not limited to) this disclosure.

In addition, although multiple operations are described in a specific order, this should not be understood as requiring them to be executed in the illustrated specific order or in sequential order. In certain environments, multitasking and parallel processing may be advantageous. Similarly, although multiple implementation details are included in the above discussion, they should not be interpreted as limiting the scope of this disclosure. Some features described in the context of individual embodiment can also be combined to be implemented in a single embodiment. On the contrary, multiple features described in the context of a single embodiment can also be implemented separately or in any suitable sub-combination in multiple embodiments.

Although the subject matter is described in language specific to structural features and/or method logical actions, it should be understood that the subject matter defined in the attached claims may not necessarily be limited to the specific features or actions described above. On the contrary, the specific features and actions described above are only exemplary forms of implementing the claims.

The invention claimed is:

1. A video texture migration method, comprising:
- acquiring an initial video;
- performing feature extraction on a target frame in the initial video to generate first feature information of the target frame, wherein the target frame is a video frame posterior to an Nth video frame in the initial video, the first feature information represents an image structure contour of the target frame, N is a positive integer, and the Nth video frame and video frames before the Nth video frame are non-target frames;
- performing feature fusion on the first feature information of the target frame and reference feature information to obtain second feature information of the target frame, wherein the reference feature information represents an image structure contour of reference frames, the reference frames are video frames prior to the target frame, and the second feature information is the first feature information undergoing removal of random noises; and
- generating a texture migration video according to the second feature information of the target frame and corresponding texture feature information, wherein the texture feature information represents an image texture detail of a reference image, and the generating the texture migration video comprises fusing, by a decoder of a video texture migration model, the second feature information of the target frame and the corresponding texture feature information.

2. The method according to claim 1, wherein performing feature fusion on the first feature information of the target frame and the reference feature information to obtain the second feature information of the target frame comprises:
- acquiring a weight coefficient sequence corresponding to the target frame, wherein the weight coefficient sequence comprises a first weight coefficient corresponding to the target frame and second weight coefficients corresponding to respective reference frames; and
- sequentially performing weighted averaging on the first feature information of the target frame and the reference feature information of corresponding reference frames, according to the first weight coefficient corresponding to the target frame and the second weight coefficients corresponding to the respective reference frames, so as to obtain the second feature information of the target frame.

3. The method according to claim 2, wherein acquiring the weight coefficient sequence corresponding to the target frame comprises:
- determining the second weight coefficients corresponding to the respective reference frames according to distances between the respective reference frames and the target frame; and
- generating the weight coefficient sequence corresponding to the target frame according to the second weight coefficients corresponding to the respective reference frames.

4. The method according to claim 1, further comprising:
- acquiring second feature information of the reference frames; and
- generating the reference feature information according to the second feature information of the reference frames.

5. The method according to claim 1, wherein generating the texture migration video according to the second feature information of the target frame and corresponding texture feature information comprises:
- generating a texture migration image corresponding to the target frame according to the second feature information of the target frame and corresponding texture feature information; and
- combining texture migration images corresponding to respective target frames based on play timing of the respective target frames in the initial video, so as to generate the texture migration video.

6. The method according to claim 5, wherein generating the texture migration image corresponding to the target frame according to the second feature information of the target frame and corresponding texture feature information comprises:
- performing texture fusion on the second feature information of the respective target frames and corresponding texture feature information through a pre-trained generative adversarial net model, so as to generate the texture migration image.

7. The method according to claim 1, further comprising:
- performing feature extraction on the target frame in the initial video to generate first texture information, wherein the first texture information represents an image texture detail of the target frame;
- performing feature extraction on the reference image corresponding to the target frame to generate second texture information, wherein the second texture information represents the image texture detail of the reference image; and
- generating the texture feature information corresponding to the target frame according to the first texture information and corresponding second texture information.

8. The method according to claim 7, wherein generating the texture feature information corresponding to the target frame according to the first texture information and corresponding second texture information comprises:
- acquiring a migration weight coefficient that is preset, wherein the migration weight coefficient represents saliency of the image texture detail of the reference image relative to the image texture detail of the target frame; and
- performing weighted averaging on the first texture information and the second texture information based on the migration weight coefficient to generate the texture feature information.

9. The method according to claim 1, wherein performing feature extraction on the target frame in the initial video to generate the first feature information of the target frame comprises:

performing feature extraction on the target frame based on an encoder in a pre-trained generative adversarial net model, so as to generate the first feature information of the target frame.

10. An electronic device, comprising: a processor and a memory in communicative connection with the processor, wherein computer execution instructions are stored in the memory; and the processor executes the computer execution instructions stored in the memory to implement operations, wherein the operations comprise:

acquiring an initial video;

performing feature extraction on a target frame in the initial video to generate first feature information of the target frame, wherein the target frame is a video frame posterior to an Nth video frame in the initial video, the first feature information represents an image structure contour of the target frame, N is a positive integer, and the Nth video frame and video frames before the Nth video frame are non-target frames;

performing feature fusion on the first feature information of the target frame and reference feature information to obtain second feature information of the target frame, wherein the reference feature information represents an image structure contour of reference frames, the reference frames are video frames prior to the target frame, and the second feature information is the first feature information undergoing removal of random noises; and generating a texture migration video according to the second feature information of the target frame and corresponding texture feature information, wherein the texture feature information represents an image texture detail of a reference image, and the generating the texture migration video comprises fusing, by a decoder of a video texture migration model, the second feature information of the target frame and the corresponding texture feature information.

11. The electronic device according to claim 10, wherein performing feature fusion on the first feature information of the target frame and the reference feature information to obtain the second feature information of the target frame comprises:

acquiring a weight coefficient sequence corresponding to the target frame, wherein the weight coefficient sequence comprises a first weight coefficient corresponding to the target frame and second weight coefficients corresponding to respective reference frames; and sequentially performing weighted averaging on the first feature information of the target frame and the reference feature information of corresponding reference frames, according to the first weight coefficient corresponding to the target frame and the second weight coefficients corresponding to the respective reference frames, so as to obtain the second feature information of the target frame.

12. The electronic device according to claim 11, wherein acquiring the weight coefficient sequence corresponding to the target frame comprises:

determining the second weight coefficients corresponding to the respective reference frames according to distances between the respective reference frames and the target frame; and generating the weight coefficient sequence corresponding to the target frame according to the second weight coefficients corresponding to the respective reference frames.

13. The electronic device according to claim 10, wherein the operations further comprise:

acquiring second feature information of the reference frames; and generating the reference feature information according to the second feature information of the reference frames.

14. The electronic device according to claim 10, wherein generating the texture migration video according to the second feature information of the target frame and corresponding texture feature information comprises:

generating a texture migration image corresponding to the target frame according to the second feature information of the target frame and corresponding texture feature information; and combining texture migration images corresponding to respective target frames based on play timing of the respective target frames in the initial video, so as to generate the texture migration video.

15. The electronic device according to claim 14, wherein generating the texture migration image corresponding to the target frame according to the second feature information of the target frame and corresponding texture feature information comprises:

performing texture fusion on the second feature information of the respective target frames and corresponding texture feature information through a pre-trained generative adversarial net model, so as to generate the texture migration image.

16. The electronic device according to claim 10, wherein the operations further comprise:

performing feature extraction on the target frame in the initial video to generate first texture information, wherein the first texture information represents an image texture detail of the target frame;

performing feature extraction on the reference image corresponding to the target frame to generate second texture information, wherein the second texture information represents the image texture detail of the reference image; and generating the texture feature information corresponding to the target frame according to the first texture information and corresponding second texture information.

17. The electronic device according to claim 16, wherein generating the texture feature information corresponding to the target frame according to the first texture information and corresponding second texture information comprises:

acquiring a migration weight coefficient that is preset, wherein the migration weight coefficient represents saliency of the image texture detail of the reference image relative to the image texture detail of the target frame; and performing weighted averaging on the first texture information and the second texture information based on the migration weight coefficient to generate the texture feature information.

18. The electronic device according to claim 10, wherein performing feature extraction on the target frame in the initial video to generate the first feature information of the target frame comprises:

performing feature extraction on the target frame based on an encoder in a pre-trained generative adversarial net model, so as to generate the first feature information of the target frame.

19. A non-transitory computer-readable storage medium, wherein computer execution instructions are stored on the non-transitory computer-readable storage medium, and a processor, when executing the computer execution instructions, implements operations, wherein the operations comprise:

acquiring an initial video;

performing feature extraction on a target frame in the initial video to generate first feature information of the target frame, wherein the target frame is a video frame posterior to an Nth video frame in the initial video, the first feature information represents an image structure contour of the target frame, N is a positive integer, and the Nth video frame and video frames before the Nth video frame are non-target frames;

performing feature fusion on the first feature information of the target frame and reference feature information to obtain second feature information of the target frame, wherein the reference feature information represents an image structure contour of reference frames, the reference frames are video frames prior to the target frame, and the second feature information is the first feature information undergoing removal of random noises; and generating a texture migration video according to the second feature information of the target frame and corresponding texture feature information, wherein the texture feature information represents an image texture detail of a reference image, and the generating the texture migration video comprises fusing, by a decoder of a video texture migration model, the second feature information of the target frame and the corresponding texture feature information.

20. The non-transitory computer-readable storage medium according to claim 19, wherein performing feature fusion on the first feature information of the target frame and the reference feature information to obtain the second feature information of the target frame comprises:

acquiring a weight coefficient sequence corresponding to the target frame, wherein the weight coefficient sequence comprises a first weight coefficient corresponding to the target frame and second weight coefficients corresponding to respective reference frames; and sequentially performing weighted averaging on the first feature information of the target frame and the reference feature information of corresponding reference frames, according to the first weight coefficient corresponding to the target frame and the second weight coefficients corresponding to the respective reference frames, so as to obtain the second feature information of the target frame.

* * * * *